UNITED STATES PATENT OFFICE.

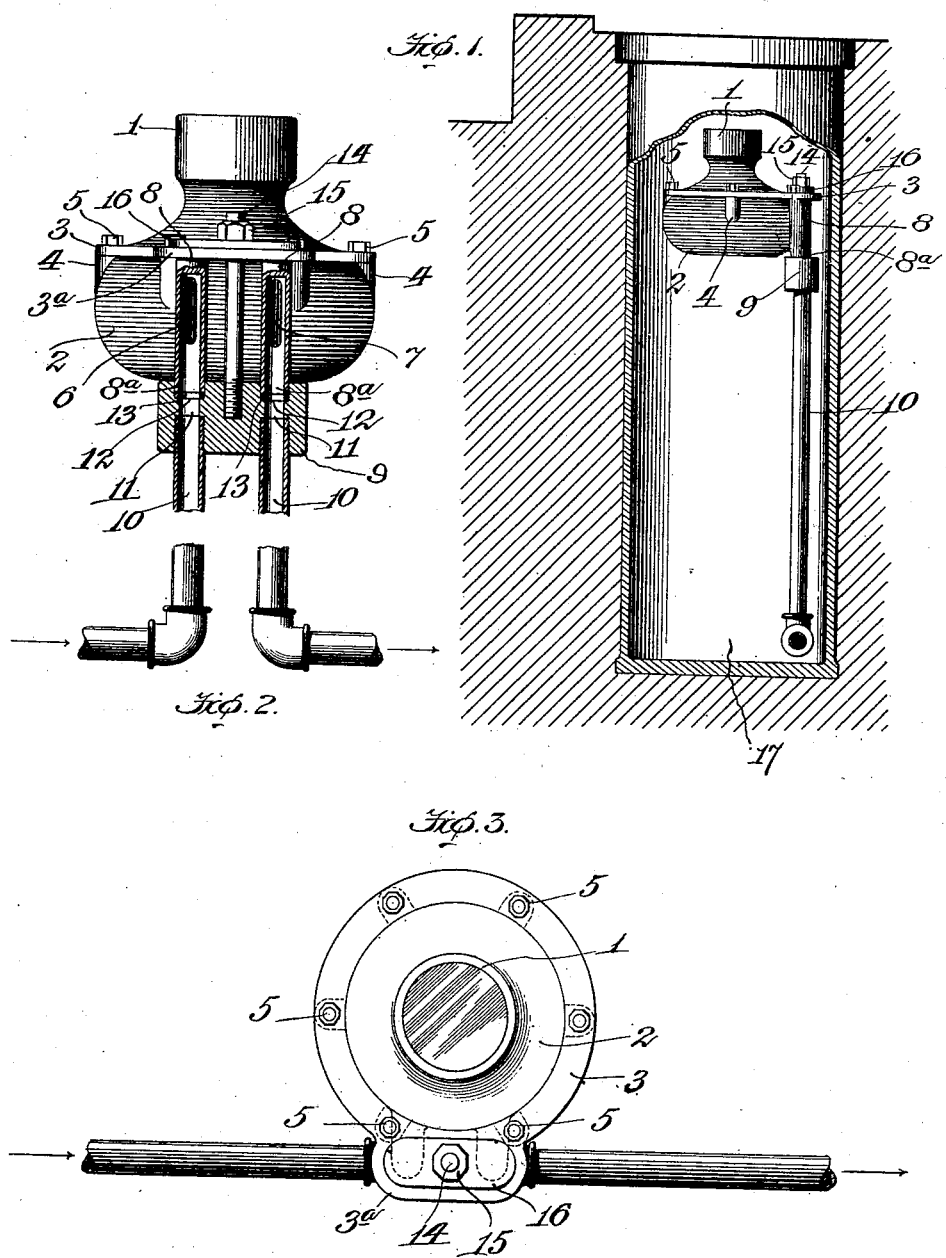

ALBERT HAMILTON KENNEDY AND CLARENCE HAMILTON KENNEDY, OF ROCKPORT, INDIANA.

WATER-METER.

No. 912,383.   Specification of Letters Patent.   Patented Feb. 16, 1909.

Application filed April 17, 1908. Serial No. 427,602.

*To all whom it may concern:*

Be it known that we, ALBERT H. KENNEDY and CLARENCE H. KENNEDY, citizens of the United States, residing at Rockport, in the county of Spencer and State of Indiana, have invented certain Improvements in Water-Meters, of which the following is a specification.

This invention is an improvement in water meters, and relates more especially to the means for connecting the meter to the service pipes.

The primary object of the invention is to provide a form of water-meter connection which will permit the meter to be located in a comparatively small box which may be only slightly larger in diameter than the diameter of the meter itself, and which will firmly support the meter at a suitable height from the bottom of the box.

A further object of the invention is to so construct the connecting means as to permit the meter to be readily removed for the purpose of examination and repair when necessary.

Other objects and advantages of the invention will hereinafter appear, and what we claim as new and desire to protect by Letters-Patent is specifically set forth in the appended claims.

In the accompanying drawings, which form a part of this specification: Figure 1 is a view showing the application of the invention. Fig. 2 is a front elevation of the meter and its connections, the latter being shown in section. Fig. 3 is a plan view of the meter and connections.

Like numerals of reference indicate like parts in all the figures of the drawings.

In the present instance we have shown the application of our invention to that form of water-meter in which the casing comprises two horizontal sections, an upper section 1, and a lower section 2; said upper section having a surrounding flange 3 at its lower end, which is widened at one side, as at 3ª, and by which flange said upper section is bolted to the lower section, for which purpose the latter is provided with spaced apart lugs 4 to receive the attaching bolts 5. As is usual in meters of this character there is provided an inlet-opening 6 through which the water enters the meter, and also an outlet-opening 7 by which the water is discharged from the meter, said openings in the present instance being formed in the lower section of the meter-casing and are spaced a short distance apart.

In carrying out our invention the meter-casing is provided with laterally-projecting portions 8, formed integrally therewith and covering the inlet and outlet openings 6 and 7, respectively, each projecting portion terminating at its upper end on a plane with the upper edge of the lower section of the meter-casing so that the flange 3, or widened portion 3ª thereof, will bear on said projections, and at its lower end each projecting portion is formed with a cylindrical portion 8ª, the purpose of which latter will be hereinafter explained. The projections 8 are each provided with a longitudinal bore which extends from the lower end of the projection to near the upper end thereof, these bores or passages communicating with the inlet and outlet openings 6 and 7, respectively, as shown in Fig. 2 of the drawings.

9 designates a coupling-block which is adapted to be connected to the upper ends of the usual service pipes, as 10, and form the coupling between said service pipes and the water-meter. This block is therefore provided with vertical openings 11 11, into the lower end of which are threaded the service pipes 10 for connection thereto; while the upper ends of said openings are countersunk to receive the lower cylindrical portions 8ª of the projections 8, and provide shoulders, as 12, against which the ends of said cylindrical portions, or interposed washers 13, will bear to form a tight joint. The cylindrical portions, as well as the openings in which they fit, are plain, and in order to force the cylindrical portions into the openings in the block and against the washers, to intimately connect the parts together, a rod 14 is secured at its lower end to the block and at its upper end projects through the flange 3ª of the meter-casing to receive a clamping-nut 15. This rod is located between the projections 8 of the meter-casing, and in order to reinforce the flange at the point where the clamping-nut bears a plate 16 is placed upon the flange and is of such length as to extend above the aforesaid projections.

As will be obvious, the tightening of the nut 15 will connect the meter securely to the coupling-block 9, and as the latter is supported at the upper ends of the service pipes 10 the meter itself will be supported in the box 17, (Fig. 1), at an elevation according to the length of said service pipes.

The connections herein shown and described provide a very simple and effective means for coupling a water-meter to the service pipes, and when it is desired for any reason to remove the meter it is only necessary to remove the nut 15 when the meter may be lifted upwardly from the block and out of the box. In resetting the meter it is adjusted so that the upper end of the rod 14 will engage the opening therefor in the flange 3ª of the meter, the lower ends of the projections 8 are introduced into the openings of the block, and after applying the plate 16 the clamping-nut 15 is screwed on the end of the rod with sufficient force to make a tight joint between the meter projections and the coupling-block. The entire operation can be readily and conveniently accomplished, and the location of the nut gives easy access to the same for attaching and removing the meter.

It will be understood, of course, that though we have shown our invention as applied to a particular form of water-meter the same may be applied to any other form of water-meter or fluid meter, it being essential only that the casing of the meter be provided with projections to fit the block and a flange to receive the rod of the clamping means; in some instances the shape of the projections and flange being modified to suit varying conditions.

Having thus described our invention what we claim is:

1. The combination, of a meter having projections through which the inlet and outlet openings pass, a coupling block coupled to the service pipes and having openings to receive the aforesaid projections, and means for clamping the block and projections together.

2. The combination, of a meter having projections through which the inlet and outlet openings pass, a coupling block having openings therethrough into one end of which the service pipes are threaded, the other end of said openings being countersunk to receive the projections on the meter, and means for clamping the block and projections together.

3. The combination, of a meter having projections through which the inlet and outlet openings pass, a coupling block having openings therethrough into one end of which the service pipes are threaded, the other end of said openings being countersunk to receive the projections on the meter and form shoulders below the latter, washers interposed between the projections and shoulders, and means for clamping the block and projections together.

4. The combination, of a meter having projections through which the inlet and outlet openings pass, a coupling-block having openings therethrough into one end of which the service pipes are threaded and into the other end of which the projections engage, a coupling-rod extending from the block through a part of the meter, and a nut threaded on the coupling-rod to engage the meter and clamp the parts together.

5. The combination, of a meter having projections through which the inlet and outlet openings pass, a block coupled to the service pipes and having countersunk openings to receive the aforesaid projections and form shoulders below the same, washers interposed between the projections and shoulders, a coupling-rod extending from the block through a part of the meter to project beyond the same, and a nut threaded on the projecting end of the rod to clamp the parts together.

6. In a meter connection, the combination with the service pipes, of a coupling-block secured to the service pipes and having countersunk openings communicating with said pipes, a meter casing having projections through which the inlet and outlet openings pass and which are adapted to fit the countersunk openings in the coupling-block, washers interposed between the projections and coupling-block, a clamping-rod secured to the coupling-block and extending through a part of the meter-casing, and a nut threaded on the end of the rod.

7. In a meter connection, the combination with the service pipes, of a coupling-block secured to the upper ends of the service pipes and having spaced apart openings in its upper side communicating with said service pipes, a rod secured to the block between the openings therein and extending upwardly from the block, a meter-casing having a projecting portion pierced to receive the rod and projections through which the inlet and outlet openings pass, said latter projections being adapted to fit the openings in the upper side of the block, and a nut threaded on the upper end of the rod to bear upon the projection through which said rod passes.

8. In a meter connection, the combination with the service pipes, of a coupling-block secured to the upper ends thereof and having spaced apart openings in its upper side communicating with said service pipes, a clamping-rod secured to the block between the openings therein and extending upwardly from the block, a meter casing comprising an upper section and a lower section, the former having an outwardly-projecting flange at its lower end and the latter section having projections below said flange and through which the inlet and outlet openings pass, said projections being adapted to fit the openings in the upper side of the coupling-block and the flange having an opening through which the clamping-rod passes, a reinforcing plate placed on the flange and having an opening through which the rod passes, and a nut threaded on the upper end of the rod to impinge against the plate and clamp the parts together, substantially as herein shown and described.

In testimony whereof we have signed our names to this specification in the presence of two subscribing witnesses.

ALBERT HAMILTON KENNEDY.
    CLARENCE HAMILTON KENNEDY.

Witnesses for A. H. Kennedy:
    FRED C. COCHRAN,
    CHAS. C. CROWE.

Witnesses for C. H. Kennedy:
    CALLIE MOUNTS DAVIS,
    A. P. DAVIS.